US006343618B1

(12) United States Patent
Britt et al.

(10) Patent No.: US 6,343,618 B1
(45) Date of Patent: Feb. 5, 2002

(54) SWING CHECK BACKFLOW PREVENTER

(75) Inventors: Greg L. Britt, Indian Trail; Danny S. Meyer; Timothy D. Price, both of Monroe; Robert V. Funderburk, Salisbury, all of NC (US)

(73) Assignee: Conbraco Industries, Inc., Matthews, NC (US)

( * ) Notice: Subject to any disclaimer, the term of this patent is extended or adjusted under 35 U.S.C. 154(b) by 0 days.

(21) Appl. No.: 09/514,093

(22) Filed: Feb. 28, 2000

(51) Int. Cl.$^7$ .............................................. F16K 15/03
(52) U.S. Cl. ...................... 137/527; 137/512; 251/337; 251/87
(58) Field of Search ................................ 137/512, 527, 137/527.4, 527.2; 251/85, 87, 337, 303

(56) References Cited

U.S. PATENT DOCUMENTS

| | | | |
|---|---|---|---|
| 3,906,987 A | | 9/1975 | Rushforth et al. |
| 4,067,356 A | * | 1/1978 | Kreuz .......................... 137/527 |
| 4,249,567 A | * | 2/1981 | Weiss .......................... 137/512 |
| 4,253,489 A | * | 3/1981 | Schleiter, Sr. ................ 137/527 |
| 4,872,479 A | * | 10/1989 | Scaramucci ............. 137/527.4 X |
| 4,872,480 A | * | 10/1989 | Scaramucci ............. 137/527.4 X |
| 4,989,635 A | | 2/1991 | Dunmire |
| 5,046,525 A | | 9/1991 | Powell |
| 5,125,457 A | * | 6/1992 | Meaders .................. 137/527 X |
| 5,236,009 A | * | 8/1993 | Ackroyd ....................... 137/527 |
| 5,305,985 A | * | 4/1994 | Fendley et al. ................ 251/85 |
| 5,318,063 A | * | 6/1994 | Muddiman ................ 137/454.2 |
| 5,709,240 A | | 1/1998 | Martin et al. |
| 5,711,341 A | | 1/1998 | Funderburk et al. |
| 5,794,655 A | | 8/1998 | Funderburk et al. |
| 5,855,224 A | * | 1/1999 | Lin et al. ..................... 137/527 |
| 5,947,152 A | | 9/1999 | Martin et al. |
| 6,050,293 A | * | 4/2000 | Lin et al. ..................... 137/527 |
| 6,050,294 A | * | 4/2000 | Makowan ..................... 137/527 |
| 6,155,291 A | * | 12/2000 | Powell ....................... 137/527.8 |

OTHER PUBLICATIONS

Febco Specification Sheet for Model 856 Double Check Detector Assembly; dated Nov., 1992; Issue 1192 (US).

* cited by examiner

*Primary Examiner*—John Rivell
*Assistant Examiner*—Meredith H Schoenfeld
(74) *Attorney, Agent, or Firm*—Adams, Schwartz & Evans, P.A.

(57) ABSTRACT

A swing check valve for controlling fluid flow, including a valve housing having a port for fluid flow therethrough with a removable cover for accessing an interior of the valve housing. A valve assembly is positioned within the interior of the valve housing for controlling the fluid flow through the valve housing. The valve assembly includes a valve seat in fluid communication with the port and a clapper mounted in the valve housing on a pivotally-mounted rocker arm and moveable between an open position responsive to fluid flow in a flow direction and a closed position sealed against the valve seat responsive to fluid flow in an opposite, backflow direction. A spring is captured in the valve housing by the removable cover without attachment to either the cover or valve housing, and normally urges the clapper into the closed position sealed against the valve seat. A first pivot is carried by the spring and cooperates with a mating interior surface of the cover for permitting unattached pivotal movement of the spring relative to the cover. A second pivot is carried by the spring and cooperates with a mating pivot surface carried on the rocker arm for permitting unattached pivotal movement of the spring relative to the rocker arm whereby the spring is allowed to pivot within the valve housing responsive to movement of the clapper. Also disclosed is an alignment spring mechanism for preventing "heel drag" as the clapper is closing.

12 Claims, 5 Drawing Sheets

SWING CHECK BACKFLOW PREVENTER

TECHNICAL FIELD AND BACKGROUND OF THE INVENTION

This invention relates to a type of valve known as a "check-valve." Check valves are well known and are widely used to control backflow of fluids carrying undesirable contaminants into a fluid supply. These valves have evolved to become highly specialized in their function and operation. These valves are similar in that they all contain spring-loaded members that are biased towards the valve-closed position until fluid pressure acting on the checking members forces the valves open. Typically, a backflow preventer utilizes two check valves in a conventional serial combination for preventing the backflow of a fluid.

The pressure required to open a check valve is established by regulation and provides a minimum degree of protection against reverse flow. Furthermore, regulations governing backflow preventers require that a check valve and associated parts must be removable for inspection and for field service repair without having to remove the valve housing from the fluid conduit system to which it is attached.

In a conventional design, the checking member is a poppet-type check in which the movement of the checking member is linear and remains in the fluid path. The energy required to open these check valves is provided by the fluid and is created at the source by, for example, a pump. The total energy of the fluid in motion is reduced by friction within the pipes and other obstacles in the fluid conduit system which include these checking members that remain disposed directly in the fluid path once the check valves are open. This energy loss, also known as "headloss," should be as low as practicable in order to preserve fluid pressure.

Many designs to reduce headloss resulting from poppet check valves have been proposed. One design uses a "swing check" type design in which the checking member, also called a clapper, rotates about a fixed hinge pin. The swing check valve is advantageous because it allows the checking member to move out of the path of fluid flow thereby reducing the headloss associated with conventional poppet-check valves. Clapper and spring assemblies in these conventional swing check designs can be oriented so that, as the clapper moves away from the valve-closed position, the torque produced by the spring force about the pivot axis of the clapper through the hinge pin is reduced, thereby further minimizing headloss.

Conventional swing check valves used in backflow preventers generally incorporate the same components. Typically, the clapper in such valves creates a fluid seal across a valve seat, the valve seat surrounding an opening through which fluid would otherwise flow. The valve seat is usually positioned adjacent a fluid inlet port in a valve housing of the fluid conduit system and typically is mounted by bolts to the valve housing. As the fluid flows through the port in the downstream direction, the clapper opens by rotating about a hinge pin that lies adjacent and parallel to the valve seat face. A helical compression spring is typically used to exert force onto the backside of the clapper, and the quantity of water allowed to flow through the swing check valve directly depends on the opening angle of the clapper and the spring pressure that acts to oppose this opening. This pressure is a function of the degree of compression between the clapper and some other rigid structure such as the valve housing, and fluid pressure must exceed a predetermined magnitude to overcome the spring force on the clapper in order to open the valve.

A toggle-linkage swing check valve is disclosed in Ackroyd, U.S. Pat. No. 5,236,009, which includes a valve assembly having a clapper, spring, and valve seat connected together as a unit. The valve is pivotally mounted at opposite ends to the valve seat and clapper for reorientation of the spring force during movement of the clapper so that the resultant torque applied to the clapper decreases as the clapper moves away from the valve-closed position. A disadvantage to the swing check backflow preventer of Ackroyd is that when the valve requires maintenance, a cover of the valve housing must be removed and then retaining wires must be removed so that the valve assembly can be manually disengaged from the inlet and then withdrawn from the valve housing. Installation of the valve includes the reverse steps.

Another toggle-linkage swing check valve is disclosed in Dunmire, U.S. Pat. No. 4,989,635, which includes a valve assembly having a spring, clapper, and valve seat connected together as a unit. The spring is positioned between the clapper of the clapper and a wall of the valve housing which, is preferably a recess in the cover of the valve housing. Moreover, the spring is positioned within the recess and pivotally mounted to the clapper for urging the clapper into the valve-closed position so that the torque produced by the spring on the clapper decreases as the clapper pivots away from the valve-closed position. The clapper is attached to the valve seat, which is mounted by bolts to the valve housing. A disadvantage to the swing check valve of Dunmire is that replacement of the valve assembly consequently requires the removal of the housing cover; the removal of the bolts that attach the valve assembly to the valve housing; and then the withdrawal of the valve assembly from the valve housing with careful control of the spring, which becomes free to pivot about its attachment to the clapper once the cover is removed. The valve assembly of Dunmire thus presents an awkward handling situation when the valve assembly requires assembly, replacement, or maintenance.

Yet another design for swing check valves is the "Regev" valve manufactured by A. R. I. Kfar Charuv of Ramot Hagolan, Israel. The valve includes a valve housing having a spring and a clapper that are positioned adjacent an inlet port of a valve housing. The spring includes a spring base and the clapper has a cam member that remains in continuous engagement with the spring base. The clapper is mounted to the valve housing by a hinge pin and the spring is positioned in a valve housing recess above the clapper so that it is axially compressible in a direction perpendicular to fluid flow through the valve housing and forces engagement of the spring base with the cam member to force the clapper towards the valve-closed position. The spring does not vary in its orientation during movement of the clapper as in the toggle-linkage designs discussed above, i.e., the spring is not pivotally mounted at its ends. The torque produced by the spring force on the clapper about the hinge pin is reduced as the clapper moves away from the valve-closed position to thereby minimizing headloss. A disadvantage to the Regev valve is that, in order to replace any component of the valve assembly or replace the entire valve assembly itself, the entire valve housing must be removed from the fluid conduit system and replaced. Furthermore, comparing the Regev valve to the valves of Ackroyd and Dunmire, there is no valve assembly disposable within a valve housing in the Regev valve which can be removed from a fluid conduit system without removing the valve housing as required by backflow preventer regulation.

More recent designs for swing-type backflow preventer valves are disclosed in applicant's Patent Nos. 5,711,341 and 5,794,655. Both of these patents disclose a valve housing having a spring and a clapper that are positioned adjacent an inlet port. The spring includes a base, with the rocker arm of the clapper having a roller which remains in continuous engagement with the spring base. The top end of the spring is attached to the interior surface of a hydraulic tap threaded into the valve housing. The clapper is mounted to the valve housing by a hinge pin and the spring is positioned in a valve housing recess above the clapper so that it is axially compressible in a direction perpendicular to fluid flow through the valve housing and forces engagement of the spring with the cam member to force the clapper towards the valve-closed position. The spring remains in a position perpendicular to the direction of fluid flow at all times.

SUMMARY OF THE INVENTION

Therefore, it is an object of the invention to provide an improved swing check valve which can be easily and readily removed from and inserted into a valve housing of a fluid conduit system by simply removing and installing, respectively, a cover of the valve housing.

It is another object of the invention to provide an improved swing check valve which has a simple, low maintenance, low friction clapper mechanism that creates low headloss.

It is another object of the invention to provide a swing check valve which has a narrow profile thereby reducing valve height.

It is another object of the invention to provide a swing check valve which has a compression spring which is self-contained and requires no interior attachment.

It is another object of the invention to provide a swing check valve which is energized during final assembly.

It is a further object of the present invention to provide an improved swing check valve which includes a spring that is removably positioned against the valve housing cover and that is oriented for axial compression and expansion of the spring at varying angles within a range of angles, all of which are oblique to the direction of fluid flow through the valve housing.

It is another object of the invention to provide a swing check valve which has characteristics which provide a low, relatively flat headloss curve.

It is another objective of the present invention to provide an improved swing check backflow preventer which utilizes two swing-check valves of the present invention in serial combination with one another.

These and other objects of the present invention are achieved in the preferred embodiments disclosed below by providing a swing check valve for controlling fluid flow, comprising a valve housing having a port for fluid flow therethrough, the valve housing including a removable cover for accessing the interior of the valve housing. A valve is disposed within the interior of the valve housing for controlling the fluid flow through the valve housing. The valve includes a valve seat in fluid communication with the port and a clapper mounted in the valve housing on a pivotally-mounted rocker arm and moveable between an open position responsive to fluid flow in a flow direction and a closed position sealed against the valve seat responsive to fluid flow in an opposite, backflow direction. A spring is captured in the valve housing by the removable cover without attachment to the cover, and normally urges the clapper into the closed position sealed against the valve seat. A first pivot is carried by the spring and cooperates with a mating interior surface of the cover for permitting unattached pivotal movement of the spring relative to the cover. A second pivot is carried by the spring and cooperates with a mating pivot surface carried on the rocker arm for permitting unattached pivotal movement of the spring relative to the rocker arm whereby the spring is allowed to pivot within the valve housing responsive to movement of the clapper.

According to one preferred embodiment of the invention, the first pivot carried by the spring comprises a ball and the mating interior surface of the cover comprises a concave surface against which the ball pivots.

According to another preferred embodiment of the invention, the second pivot comprises a convex bearing surface carried by the spring and the mating pivot surface carried on the rocker arm comprises at least one roller.

According to yet another preferred embodiment of the invention, the second pivot comprises a convex bearing surface carried by the spring and the mating pivot surface carried on the rocker arm comprises a pair of spaced-apart rollers mounted on the rocker arm.

Preferably, the second pivot comprises a convex bearing surface carried by the spring and the mating pivot surface carried on the rocker arm comprises a pair of spaced-apart rollers mounted on the rocker arm, the pair of rollers including a static roller carried on a pin about which the rocker arm pivots to permit movement of the clapper and a spaced-apart dynamic roller which moves in an arc along the convex bearing surface as the clapper pivots.

According to yet another preferred embodiment of the invention, the spring is removably positioned within the valve housing for being axially compressed and expanded between two angles responsive to movement of the clapper, both of which angles are oblique to the direction of flow of fluid through the valve housing.

According to yet another preferred embodiment of the invention, the force of the spring acting on the clapper when the clapper is in the closed position produces a torque that is greater than the torque produced by the spring acting on the clapper when the clapper is in the open position.

According to yet another preferred embodiment of the invention, the clapper includes an alignment compensator for preventing out-of-alignment movement of the clapper relative to the valve seat, and comprises an alignment spring mounted on the rocker arm and engaging the clapper at a point wherein the point of attachment of the rocker arm to the clapper is between the alignment spring and the pivot point of the rocker arm.

According to yet another preferred embodiment of the invention, the alignment spring is a coil spring.

According to yet another preferred embodiment of the invention, the alignment spring is a flat spring.

According to yet another preferred embodiment of the invention, a swing check backflow preventer valve is provided which comprises a valve housing having a port for fluid flow therethrough. The valve housing includes a pair of spaced-apart removable covers for accessing an interior of the valve housing and a pair of valves disposed within the interior of the valve housing for controlling the fluid flow through the valve housing. Each of the pair of valves includes a valve seat in fluid communication with the port, a clapper pivotally mounted in the valve housing on a rocker arm and moveable between an open position responsive to fluid flow in a downstream direction and a closed position sealed against the valve seat responsive to fluid flow in an opposite, backflow direction. A spring is captured in the valve housing by a respective one of the removable covers without attachment to either the respective cover or valve housing, and normally urges the clapper into the closed position sealed against the valve seat. A first pivot is carried by the spring and cooperates with a mating interior surface of the respective cover for permitting pivotal movement of the spring relative to the respective cover. A second pivot is carried by the spring and cooperates with a mating pivot surface carried on the rocker arm for permitting pivotal movement of the spring relative to the rocker arm whereby the spring is allowed to pivot within the valve housing responsive to movement of the clapper.

According to yet another preferred embodiment of the invention, a swing check backflow preventer valve is provided which comprises valve housing means having port means for fluid flow therethrough, the valve housing means including a pair of spaced-apart removable cover means for accessing an interior of the valve housing means. A pair of valve means is disposed within the interior of the valve housing means for controlling the fluid flow through the valve housing means. Each of the pair of valve assemblies includes valve seat means in fluid communication with the port means, clapper means pivotally mounted in the valve housing means on rocker arm means and moveable between an open position responsive to fluid flow in a downstream flow direction and a closed position sealed against the valve seat means responsive to fluid flow in an opposite, backflow direction. A resilient means is captured in the valve housing means by a respective one of the removable cover means without attachment to either the respective cover means or valve housing means, and normally urges the clapper means into the closed position sealed against the valve seat means. A first pivot is carried by the resilient means and cooperates with a mating interior surface of the respective cover means for permitting pivotal movement of the resilient means relative to the respective cover means. A second pivot is carried by the resilient means and cooperates with a mating pivot surface carried on the rocker arm means for permitting pivotal movement of the resilient means relative to the rocker arm means whereby the resilient means is allowed to pivot within the valve housing means responsive to movement of the clapper means.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
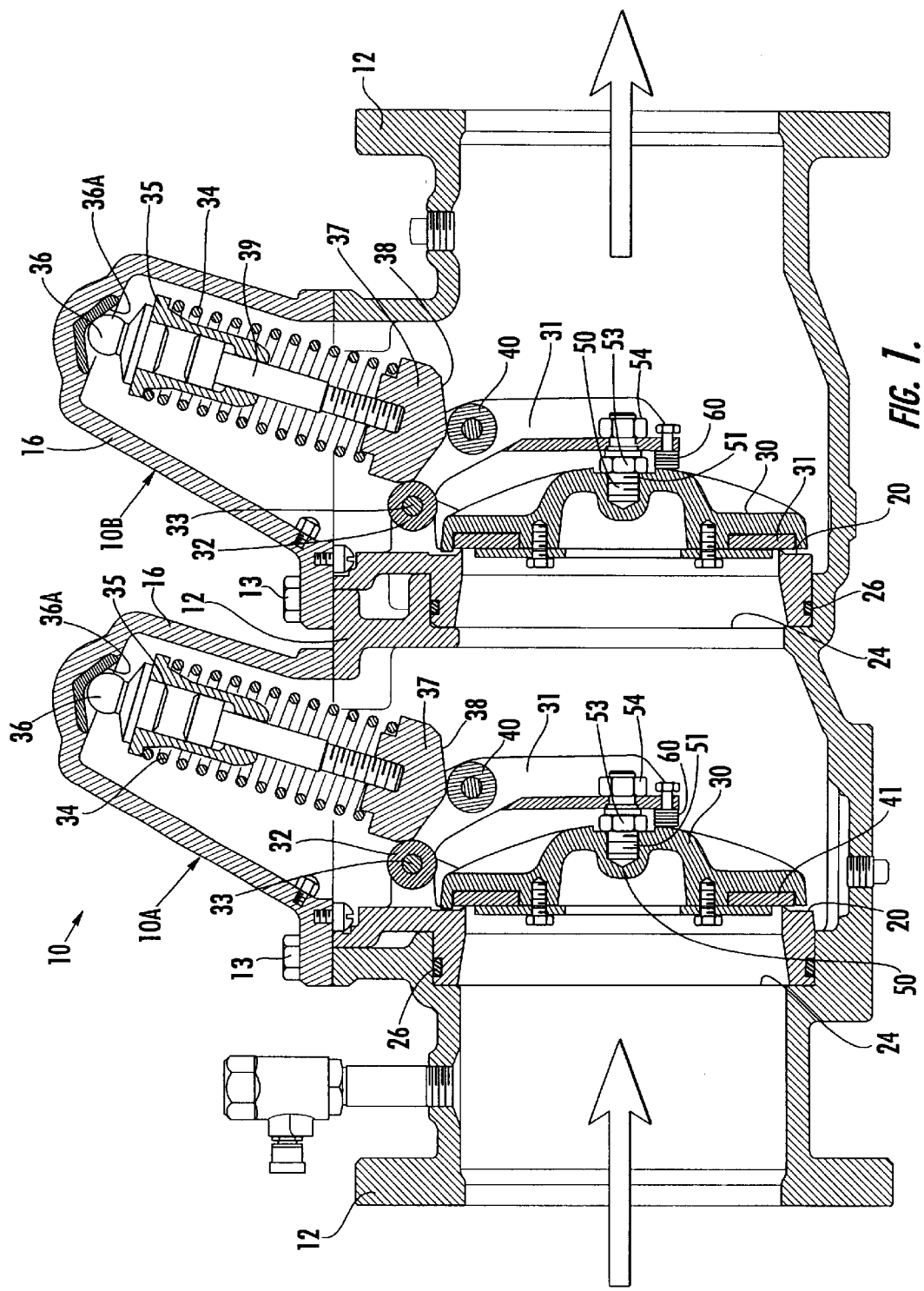
FIG. 1 is a side cross-sectional view of a backflow preventer including a valve housing having two swing check valves of the present invention in the valve-closed position.

Referring now specifically to the drawings, a backflow preventer according to the present invention is illustrated in FIG. 1 and shown generally at reference numeral 10. In the embodiment shown herein, the backflow preventer 10 includes two identical check valves 10A and 10B in series, sharing the same valve housing 12. Serial combination of two swing check valves in a valve housing to form a backflow preventer is well known in the art and will not be described in detail, the present invention residing in the structure of each of the two swing check valves 10A, 10B. This being the case, like reference numerals are used to identify like elements in each of the two swing check valves 10A, 10B.

The swing check valves 10A, 10B reside in a valve housing 12. The valve housing 12 includes two housing covers 16 removably attached by bolts 13 to the valve housing 12 for accessing the interior of the valve housing 12.

Each swing check valve 10A, 10B includes a valve seat 20 that is frictionally positionable within a port 24 of the valve housing 12 through which the fluid to be controlled by the swing check valves normally flows from upstream to downstream in the direction shown. An o-ring 26 is captured in an annular o-ring groove and forms a fluid seal between the valve seat 20 and the valve housing 12. The valves 10A, 10B also each include a clapper 30 pivotally mounted by means of a rocker arm 31 and hinge pin 32 to the housing 12. A static roller 33 concentric with the hinge pin 32 operates as described below. The term "static" describes the stationary condition of the roller 33 on the hinge pin 32.

Figure 2:
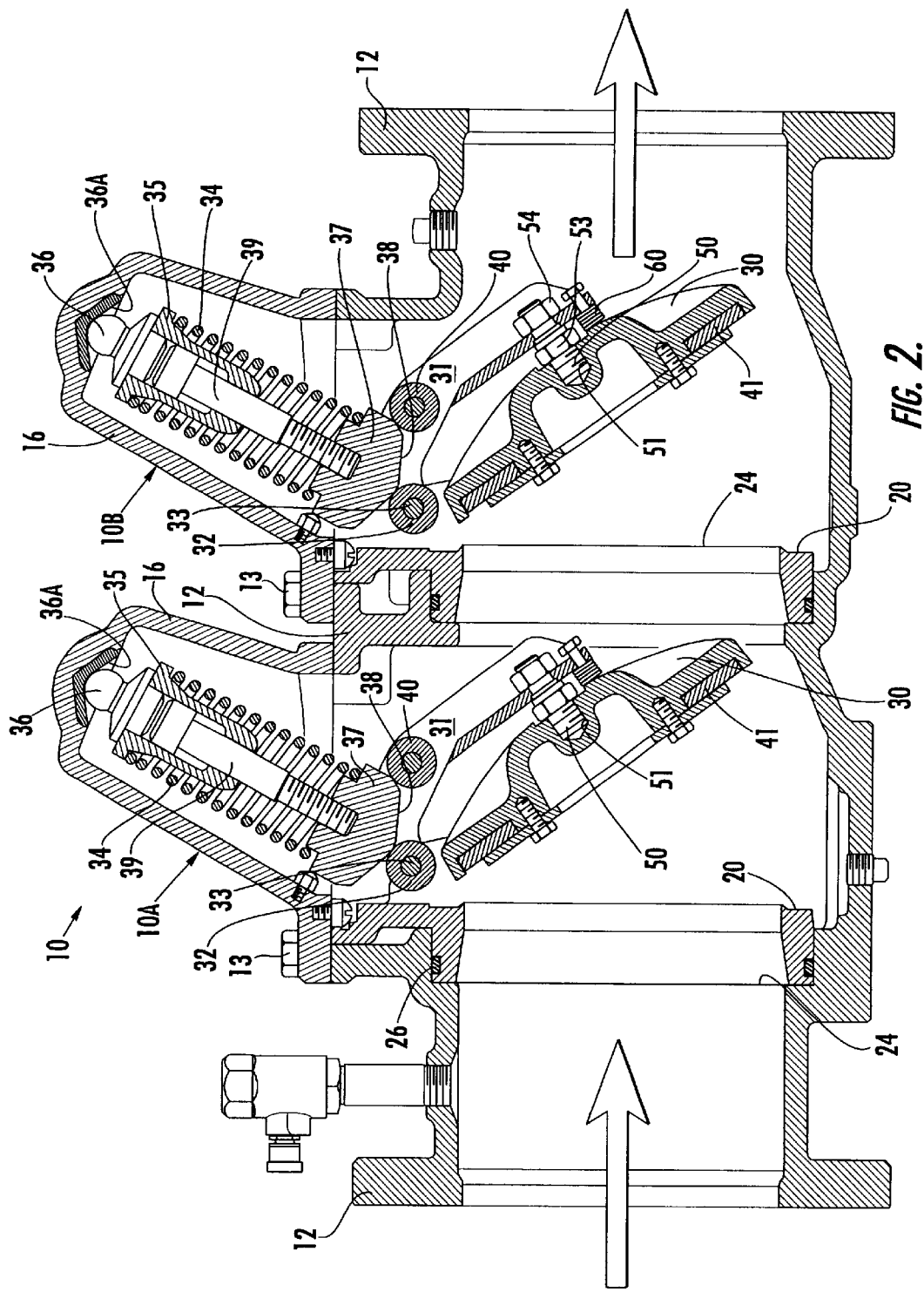
FIG. 2 is a side cross-sectional view of the backflow preventer of FIG. 1 showing the swing check valves in the valve-open position.

The clapper 30 is pivotable between a first position shown in FIG. 1 in which the clapper 30 engages the valve seat 20 and a second position shown in FIG. 2 in which the clapper 30 is pivoted out of engagement with the valve seat 20. When in abutting engagement with the valve seat 20, the clapper 30 forms a fluid-tight seal thereby blocking fluid backflow. The clapper 30 preferably includes a rubber face 41 which provides a sealing face with the valve seat 20.

A compression spring 34 is mounted for pivotal movement within the housing cover 16 and housing 12. The spring 34 is captured within the valve housing 12 and cover 16 without any attachment to any other part of the valve 10. As is shown, the top end of the spring 34 includes an annular cap 35 which carries a pivot in the form of a hardened steel ball 36. The ball 36 engages a concave surface 36A on the inside surface of the cover 16 and is therefore permitted to pivot in any direction. The bottom end of the spring 34 includes a rocker shoe 37 which has a convex cam surface 38.

A preload screw 39 is adjustably threaded into the rocker shoe 37 and permits initial adjustment of the tension of the spring 34.

In the embodiment of the present invention shown in FIGS. 1 and 2, the rocker arm 31 also includes a dynamic roller 40 for engaging the cam surface 38 of the rocker shoe 37. Note the relationship of the dynamic roller 40 on the cam surface 38 in relation to the static roller 33 and the hinge pin of 32 about which the rocker arm 31 pivots. Both rollers 33 and 40 engage the rocker shoe at spaced-apart points on the convexity. Spring 34 produces a force vector that varies with the rotation of the rocker arm 31 and the clapper 30. The rocker shoe 37 contacts the rollers 33 and 40 to produce the torque required to close the clapper 31. When the clapper 31 opens, the torque immediately begins to taper off because the point of contact between the dynamic roller 40 and the rocker shoe 37 moves closer to the static roller 33. Even though the spring 34 produces greater load as it is compressed, the moment component of the torque shortens at a rate quick enough to nevertheless achieve excellent torque reduction. FIG. 2 illustrates that when the clapper 30 is fully open, the spring force vector is nearly in line with the static roller 33. The torque at this point approaches but does not reach zero so that the clapper 30 is certain to close.

In accordance with alternative embodiments not shown, smaller backflow preventers may utilize pins or a cam molded or otherwise positioned on the backside of the clapper 30 to make direct contact with the rocker shoe 37. The pin or the cam may be fabricated from metal with a polished surface finish or a coating of any suitable friction-reducing material, or may be fabricated from any suitable plastic material. One or both of these designs may be suitable where frictional forces are relatively low.

Figure 3:
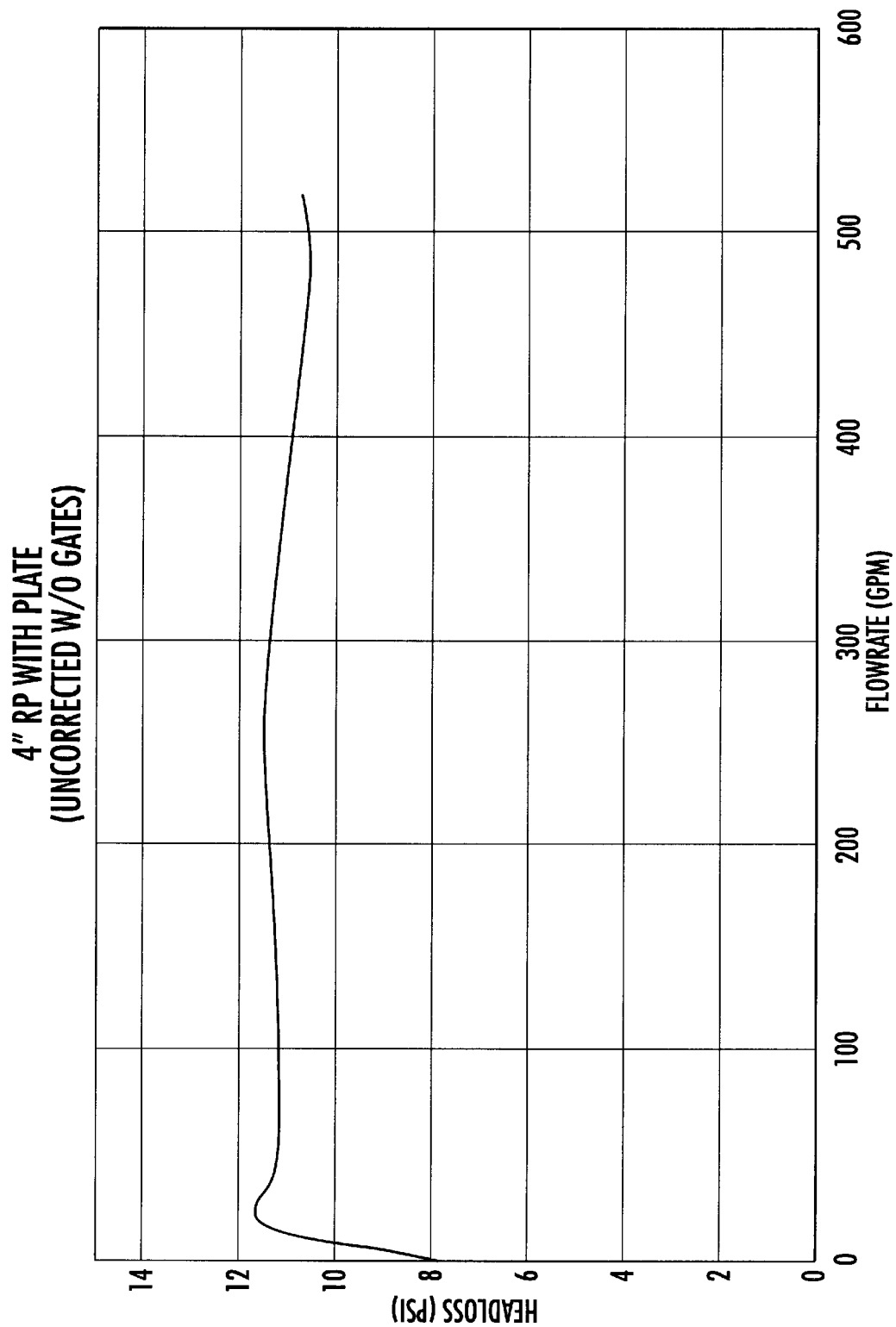
FIG. 3 is a chart which graphically shows the headloss curve for backflow preventers in accordance with an embodiment of the present invention.

As is shown in FIG. 3, a plot of the headloss in a backflow preventer in accordance with the present invention shows a flat curve which is very desirable in this type of valve.

Regulations governing the design, manufacture, installation and maintenance of backflow preventers require that the check valve and associated parts must be removable for inspection and repair in the field without removing the valve body from the water line. As is apparent from the foregoing, the operating components shown in FIGS. 1 and 2 may be removed as a unit from the top by removing the covers 16. The overall height of the backflow preventer is reduced because of the oblique rather than perpendicular orientation of the covers 16 and the springs 34 within the cover 16.

Because the assembly which includes the spring 34 and the assembly which includes the clapper 30 are completely separate and unattached, the unit is very easy to install and take apart. The cover 16 acts as a sealed access while at the same time acting as the loading mechanism and articulation surface (concave surface 36A) for the spring 34. No fasteners are needed inside the valve housing 12, therefore eliminating the need for additional machining of threads or other means of locking the elements of the valve in the correct position. In addition, the elimination of fasteners within the valve housing 12 has reduced the effort needed to install the valve components and has eliminated surfaces on which corrosion may propagate in iron-bodied valve housings that have an epoxy coating.

Referring again to FIGS. 1 and 2, the clapper 30 is mounted on the rocker arm 31 with a degree of looseness in order for the clapper to disengage properly from the valve seat 20 when the clapper opens. The clapper 30 is attached to the rocker arm 31 by means of a threaded bolt 50 which is received in a threaded bore 51 in the clapper 30. Proper spacing and between the rocker arm 31 and the clapper 30 is achieved by a nut 53. The opposite end of the bolt 50 is also threaded and is received through a bolt hole in the rocker arm and secured by a nut 54.

Figure 4:
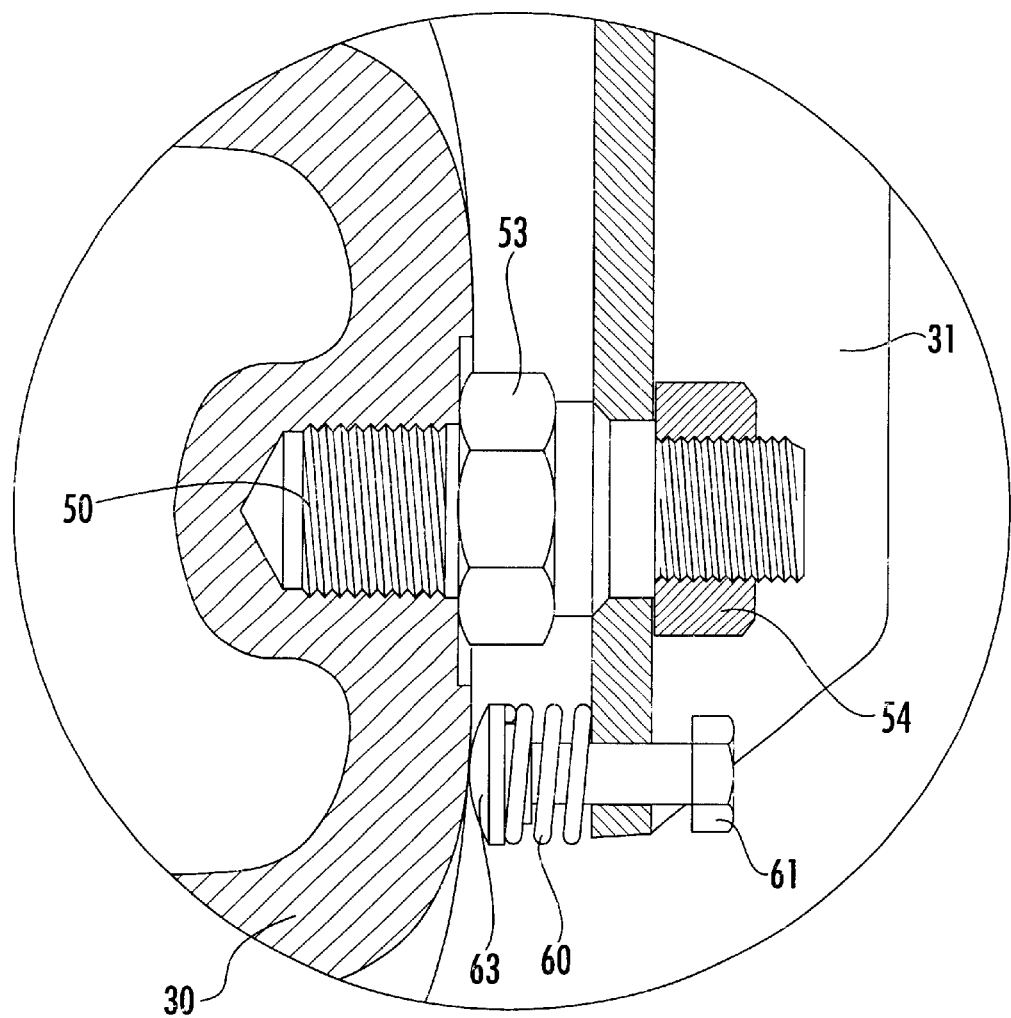
FIG. 4 is a partial cross-sectional view of one embodiment of an alignment compensator which prevents heel drag by the clapper.

While a degree of looseness between the clapper 30 and rocker arm 31 is desirable when the clapper is disengaging from the valve seat 20, such looseness can cause misalignment and "heel drag" when the clapper 30 is moving from the open to the closed, sealed position, whereby the top end of the clapper 30 adjacent the pivot point of the rocker arm 31 drags against the valve seat 20 and prevents a complete seal at the bottom of the valve seat 20. This is prevented by an alignment spring 60 which is positioned on the distal end of the rocker arm 31 and engages the back of the clapper 30. The spring 60 is adjustable by means of an adjustment bolt 61 and exerts a force against the clapper 30 which tends to force the bottom end of the clapper 30 to engage the valve seat 20 at more nearly the same time as the top end of the clapper 30 engages the valve seat 20. A convex head 63 provides a smooth bearing surface with the clapper 30. This structure is shown in detail in FIG. 4.

Figure 5:
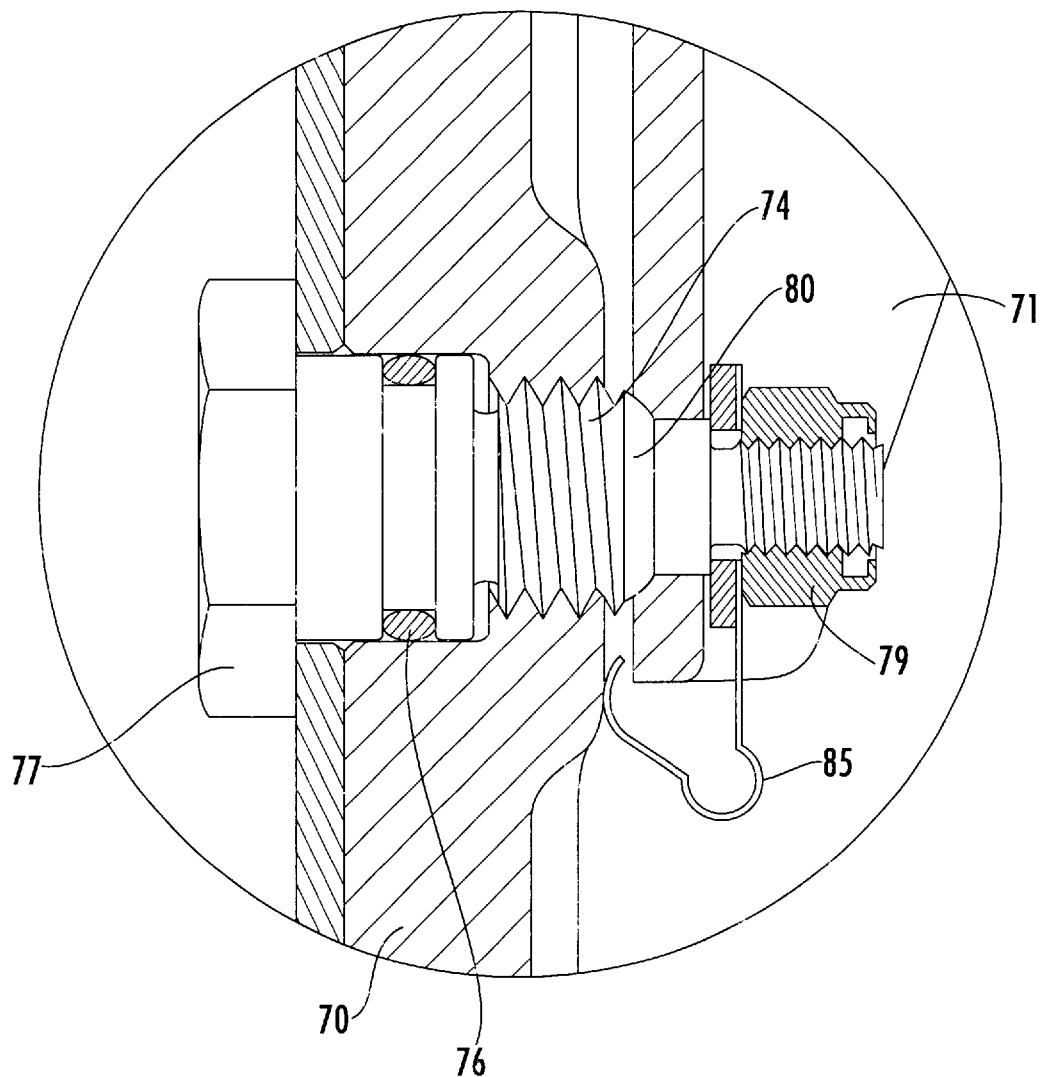
FIG. 5 is a partial cross-sectional view of an alternative embodiment of an alignment compensator which prevents heel drag by the clapper.

Another embodiment of the alignment spring is shown in FIG. 5. In this embodiment a clapper 70 is attached to a rocker arm 71 by a bolt 74. In this arrangement the bolt 74 penetrates through the clapper. Therefore, an o-ring seal 76 is provided to prevent leakage past the clapper 70 when closed. A nut 77 on the upstream side secures the bolt 74 to the clapper 70, and a nut 79 on the downstream side secures the bolt 74 to the rocker arm 71. A collar 80 provides proper spacing between the clapper 70 and the rocker arm 71. A flat spring 85 is captured by the bolt 79 and engages the back side of the clapper 70 and exerts a force against the clapper 70 which tends to force the bottom end of the clapper 70 to engage the valve seat (not shown) at more nearly the same time as the top end of the clapper 70 engages the valve seat.

A swing check backflow preventer is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A swing check valve for controlling fluid flow, comprising:
   (a) a valve housing having a port for fluid flow therethrough, said valve housing including a removable cover for accessing an interior of said valve housing; and
   (b) a valve assembly disposed within the interior of said valve housing for controlling the fluid flow through said valve housing, said valve assembly including:
      (1) a valve seat in fluid communication with said port;
      (2) a clapper mounted in said valve housing on a pivotally-mounted rocker arm and moveable between an open position responsive to fluid flow in a flow direction and a closed position sealed against said valve seat responsive to fluid flow in an opposite, backflow direction;
      (3) a spring captured in said valve housing by said removable cover without attachment to either the cover or valve housing, and normally urging the clapper into the closed position sealed against the valve seat;
      (4) a first pivot carried by the spring and cooperating with a mating interior surface of the cover for permitting unattached pivotal movement of the spring relative to the cover; and
      (5) a second pivot carried by the spring and cooperating with a mating pivot surface carried on said rocker arm for permitting unattached pivotal movement of the spring relative to the rocker arm whereby said spring is allowed to pivot within the valve housing responsive to movement of the clapper.

2. A swing check valve according to claim 1, wherein said first pivot carried by the spring comprises a ball and the mating interior surface of the cover comprises a concave surface against which said ball pivots.

3. A swing check valve according to claim 1 or 2, wherein said second pivot comprises a convex bearing surface carried by said spring and the mating pivot surface carried on said rocker arm comprises at least one roller.

4. A swing check valve according to claim 1 or 2, wherein said second pivot comprises a convex bearing surface carried by said spring and the mating pivot surface carried on said rocker arm comprises a pair of spaced-apart rollers mounted on said rocker arm.

5. A swing check valve according to claim 1 or 2, wherein said second pivot comprises a convex bearing surface carried by said spring and the mating pivot surface carried on said rocker arm comprises a pair of spaced-apart rollers mounted on said rocker arm, said pair of rollers including a static roller carried on a pin about which the rocker arm pivots to permit movement of the clapper and a spaced-apart dynamic roller which moves in an arc along the convex bearing surface as the clapper pivots.

6. A swing check valve according to claim 1, wherein said spring is removably positioned within said valve housing for being axially compressed and expanded between two angles responsive to movement of the clapper, both of which angles are oblique to the direction of flow of fluid through the valve housing.

7. A swing check valve according to claim 1 or 6, wherein the force of said spring acting on said clapper when the clapper is in the closed position produces a torque that is greater than the torque produced by said spring acting on said clapper when said clapper is in the open position.

8. A swing check valve according to claim 1, and including an alignment compensator for preventing out-of-alignment movement of the clapper relative to the valve seat, and comprising an alignment spring mounted on said rocker arm and engaging the clapper at a point wherein the point of attachment of the rocker arm to the clapper is between the alignment spring and the pivot point of the rocker arm.

9. A swing check valve according to claim 8, wherein said alignment spring is a coil spring.

10. A swing check valve according to claim 8, wherein said alignment spring is a flat spring.

11. A swing check backflow preventer valve, comprising:
   (a) a valve housing having a port for fluid flow therethrough, said valve housing including a pair of spaced-apart removable covers for accessing an interior of said valve housing; and
   (b) a pair of valve assemblies disposed within the interior of said valve housing for controlling the fluid flow through said valve housing, each of said pair of valve assemblies including:
      (1) a valve seat in fluid communication with said port;
      (2) a clapper pivotally mounted in said valve housing on a rocker arm and moveable between an open position responsive to fluid flow in a downstream direction and a closed position sealed against said valve seat responsive to fluid flow in an opposite, backflow direction;
      (3) a spring captured in said valve housing by a respective one of said removable covers without attachment to either the respective cover or valve housing, and normally urging the clapper into the closed position sealed against the valve seat;
      (4) a first pivot carried by the spring and cooperating with a mating interior surface of the respective cover for permitting pivotal movement of the spring relative to the respective cover; and
      (5) a second pivot carried by the spring and cooperating with a mating pivot surface carried on said rocker arm for permitting pivotal movement of the spring relative to the rocker arm whereby said spring is allowed to pivot within the valve housing responsive to movement of the clapper.

12. A swing check backflow preventer valve, comprising:
   (a) valve housing means having port means for fluid flow therethrough, said valve housing means including a pair of spaced-apart removable cover means for accessing an interior of said valve housing means; and
   (b) a pair of valve assembly means disposed within the interior of said valve housing means for controlling the fluid flow through said valve housing means, each of said pair of valve assemblies including:
      (1) valve seat means in fluid communication with said port means;
      (2) clapper means pivotally mounted in said valve housing means on rocker arm means and moveable between an open position responsive to fluid flow in a downstream flow direction and a closed position sealed against said valve seat means responsive to fluid flow in an opposite, backflow direction;
      (3) resilient means captured in said valve housing means by a respective one of said removable cover means without attachment to either the respective cover means or valve housing means, and normally urging the clapper means into the closed position sealed against the valve seat means;
      (4) a first pivot carried by the resilient means and cooperating with a mating interior surface of the respective cover means for permitting pivotal movement of the resilient means relative to the respective cover means; and
      (5) a second pivot carried by the resilient means and cooperating with a mating pivot surface carried on said rocker arm means for permitting pivotal movement of the resilient means relative to the rocker arm means whereby said resilient means is allowed to pivot within the valve housing means responsive to movement of the clapper means.

* * * * *